Feb. 10, 1931.  A. J. DIESCHER  1,792,147
MEANS FOR CONTROLLING ENGINES
Filed Jan. 21, 1929   2 Sheets-Sheet 1

INVENTOR
Alfred J. Diescher.
BY
ATTORNEY

Feb. 10, 1931.  A. J. DIESCHER  1,792,147
MEANS FOR CONTROLLING ENGINES
Filed Jan. 21, 1929   2 Sheets-Sheet 2
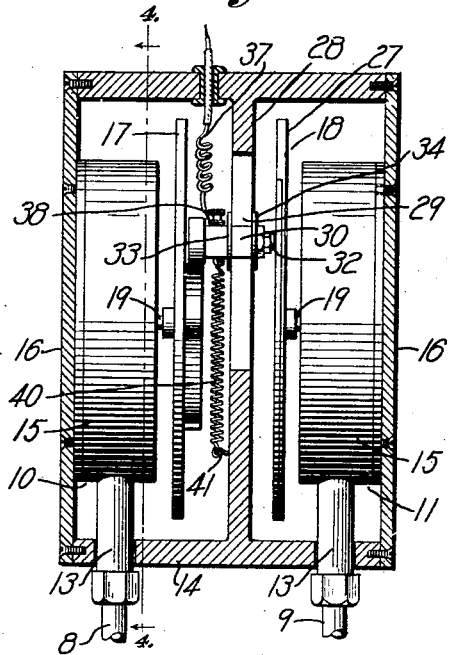
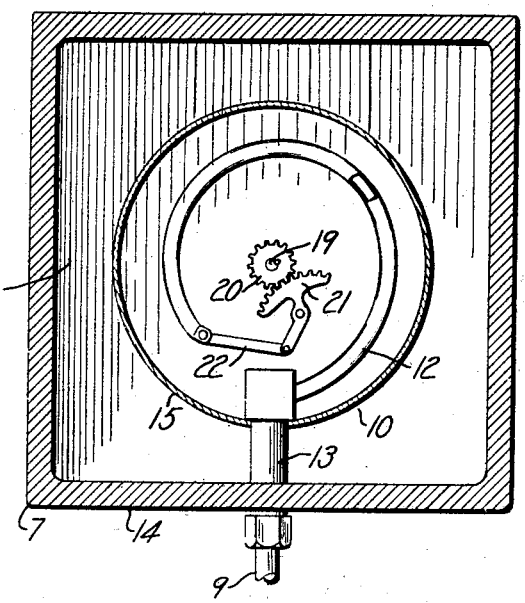
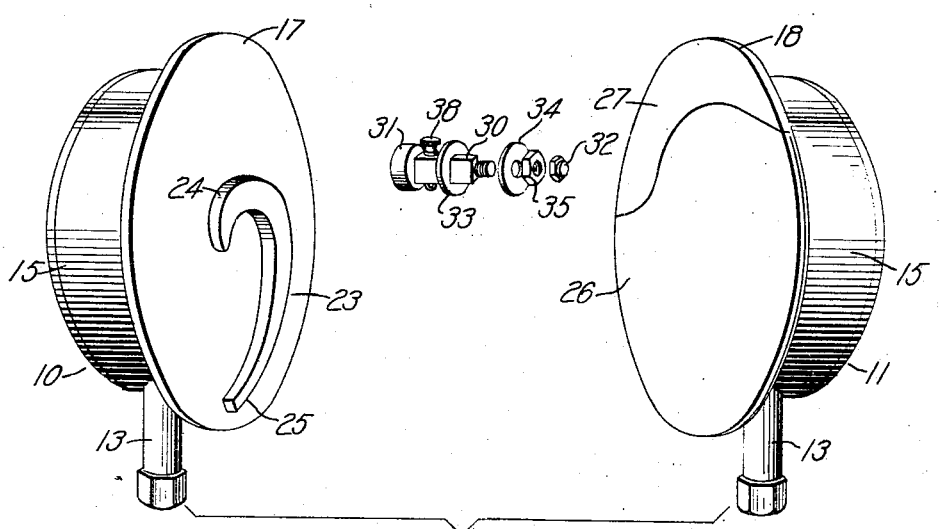
INVENTOR
Alfred J. Diescher.
BY 
ATTORNEY Patented Feb. 10, 1931

1,792,147

UNITED STATES PATENT OFFICE

ALFRED J. DIESCHER, OF WINFIELD, KANSAS

MEANS FOR CONTROLLING ENGINES

Application filed January 21, 1929. Serial No. 333,882.

My invention relates to compressors and more particularly to gas compressors operating under variable intake and discharge pressure, such as those employed in transporting gas from the producing fields to points of consumption, the principal object of the invention being to control the operation of the compressor within a predetermined range of power demand whereby driving mechanism having relatively low power rating may be employed, and the expense of installing and operating compressor stations may be reduced.

It is well known that the intake and discharge pressures of apparatus of this character vary widely with the supply and demand and that the maximum load on the compressor is related to the ratio between the pressures and occurs at a point which can be predetermined between two extremes. One of said extremes consists in a condition of no pressure in an intake and maximum pressure in the discharge line, the other extreme being the condition wherein the intake pressure equals the discharge pressure and no work is required of the compressor. The maximum load on the compressor occurs approximately at the point wherein the intake pressure is one-third of the discharge pressure.

Compressors and engines therefore have heretofore been provided having a maximum capacity or power rating capable of safe operation when the maximum ratio of the two pressures occurs, although substantially less power may be required for normal operation and the dangerous ratio of pressures may seldom be reached, since it is necessary to avoid hazard of breakage or damage to the compressor plant in case of suspension of supply or marked variation in demand.

Further objects of my invention are, therefore, to control the operation of a compressor according to variations in the ratio of the intake pressure to the discharge pressure, to suspend operation of the compressor when the load thereon exceeds a predetermined value, and to provide automatically operable control mechanism whereby compressor plants having limited power capable of caring for the normal demand may safely be installed in systems wherein the intake and discharge pressures vary.

A further and particular object of the invention is to adapt control mechanism for becoming effective according to ratios of like influences to which they are responsive.

In accomplishing these and other objects of the invention, I have provided improved details of structure, the preferred forms of which are illustrated in the accompanying drawings, wherein:

Fig. 3 is a vertical section of the device, tubes for connecting the device to the intake and discharge lines being shown fragmentarily.

Fig. 4 is a transverse vertical section of the device on the line 4—4, Fig. 3.

Fig. 5 is a perspective view of two members connected respectively with the intake and discharge lines, and a partly disassembled contact bar movable by the intake-controlled member into conductive relation with the discharge-connected member for controlling the compressor.

Figure 1:
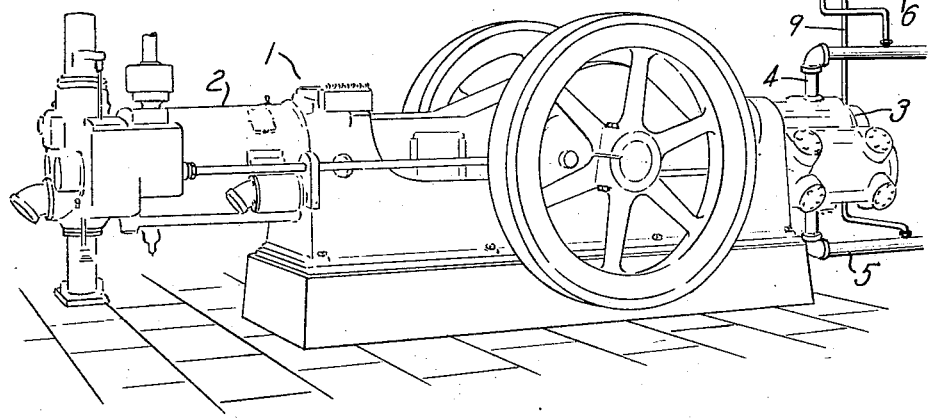
Fig. 1 is a perspective view of a compressor and an engine for operating the same, and my control device connected to the intake and discharge lines of the compressor.

Referring in detail to the drawings:

1 designates generally an engine having a cylinder 2, and 3 a compressor provided with an intake line 4 and a discharge line 5, all of which may be of the ordinary construction employed in compressor plants in systems for transporting gas from a producing field. The engine may be of any desired type and is illustrated as an internal combustion engine provided with an electric circuit 6 for igniting the charges of fuel.

My device includes a housing 7 supported by tubes 8 and 9 communicating respectively with the intake and discharge lines, and two pressure responsive members 10 and 11 positioned in the housing and preferably including Bourdon tubes 12 having stems 13 extending through the bottom plate 14 of the housing and connected to the tubes 8 and 9.

The tubes are supported in and fixed to shells 15 fixed to parallel side walls 16 of the housing and disks 17 and 18 rotatably supported concentrically of the shells by shafts 19 keyed to gears 20 are operable by segments 21 pivotally supported by the housing and movable by the links 22 of the Bourdon tubes, whereby the disks may be moved rotatably in response to variations in pressure in the intake and discharge lines.

Mounted on the face of the disk 17 of the intake-connected member 10 is a cam 23 having its inner end 24 positioned adjacent the axis of the disk and its outer end 25 located adjacent the periphery of the disk, the disk 18 on the discharge-controlled member 11 including an insulating plate 26 and a conductor plate 27 connected to the disk and capable of being grounded through the shaft 19 into the housing and compressor, all for purposes presently described.

The members 10 and 11 are positioned in alignment on opposite side walls of the housing with their disks registering and arranged in parallel, spaced relation. A dividing wall 28 located midway of the housing between the side walls and parallel thereto, is provided with a vertically elongated slot 29 for slidable support of a contact bar 30 having a roller 31 rotatably supported at one end for engagement with the cam 23 and a contact point 32 at its other end adapted to move in frictional contact with the face of the disk 18.

Washers 33 and 34 are mounted on the bar 30 to retain the same movably in the slotted dividing wall 28, the washer 34 being removable to permit insertion of the bar through the slot and a nut 35 being provided to retain the washer on the bar. The body of the bar is rectangular for fitting slidably in the slot and has suitable length proportionate to the thickness of the wall to space the washers and prevent binding of the mounted bar. The contact point 32 is preferably screw-threadedly mounted on the outer end of the bar.

A conductor 37 is connected to a binding post 38 on the bar and leads to a circuit control device generally designated 39, and may comprise a solenoid for controlling the circuit 6, the circuit through the conductor 37 being closed when the contact point 32 is in conductive relation with the contact plate 27 on the member 11.

The bar 30 is movable vertically in the slotted dividing wall by the cam engaging the roller 31 upon rotation of the disk 17. When the roller and bar are moved to maximum position by the cam point 25, the point 32 will be in contact with an area of the disk 18 adjacent the periphery of the disk. The bar is returned to normal position by a coil spring 40 anchored at 41 to the dividing wall.

The disk 17 rotates responsively to variations in pressure in the intake line, and it is apparent therefore that if the disk 18 were stationary and the contact plate 27 were in fixed position, the control device would be responsive merely to variations in pressure in the intake.

Since it is desired to make the control device effective when the two pressures are in a predetermined relation, the disk 18 is rotatably movable responsively to variations in pressure in the discharge line. Increasing pressure in the discharge line therefore, may cause the disk 18 to move rotatively in an anti-clockwise direction so that when increasing pressure in the intake causes the intake member to move also in an anticlockwise direction, the contact bar will be moved over the insulating portion 26 of the disk, the conductive plate 27 will not be touched. Thus the relatively unchanged ratio of intake and discharge pressures under which no increased load is put upon the compressor, will bring about no modification in the operation of the engine.

Should the pressure in the discharge line increase, however, while the pressure in the intake is stationary or slightly changed, the contact plate 27 will be moved toward and into contact with the cam supported contact bar 30, thereupon closing the control circuit and causing suspension of operation of the engine.

It is apparent therefore that the operation of the engine is controlled in accordance with the ratio of the intake pressure to the discharge pressure whether the pressures are small or large.

Figure 2:
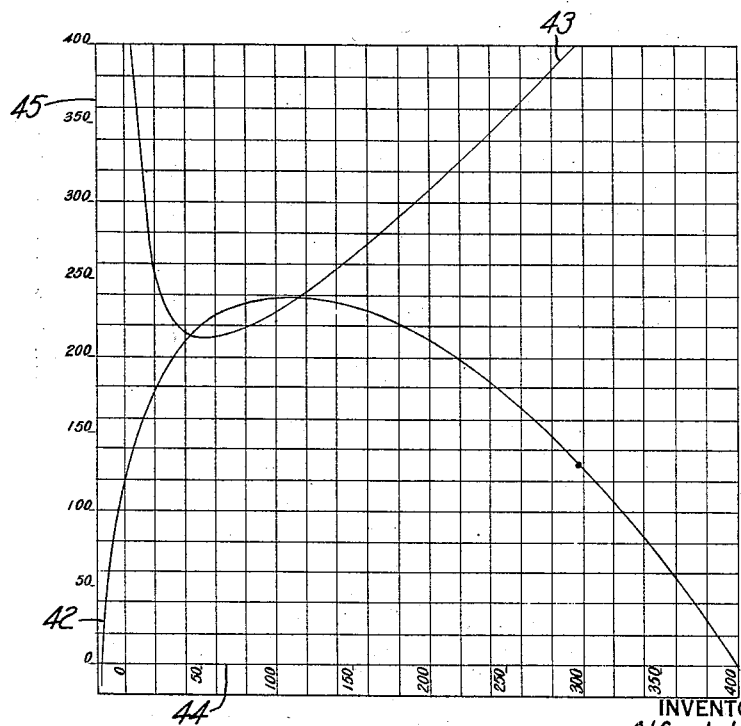
Fig. 2 is a chart illustrating the relation between the intake and discharge pressures and particularly disclosing ratio at which the maximum load is imposed on the compressor, and also the corresponding reduction in maximum discharge pressures attainable with constant power under the varying ratio to intake pressure curve.

In Fig. 2 curve 42 shows the fluctuating power demanded, for constant discharge pressure, as the intake pressure varies on the scale 44 and curve 43 shows the fluctuation in maximum discharge pressure attainable on scale 45 with varying intake pressures on scale 44, with a maximum available power, in this case sufficient to compress gas from 295 pounds intake to 400 pounds discharge pressure. The curves and positions of the cam and the contact plate 27 are therefore calculated in accordance with the curves shown in Fig. 2 whereby the contact is conductively engaged with the contact plate 27 upon approach of the dangerous ratio.

What I claim and desire to secure by Letters Patent is:

1. In a control device for limiting the loading of a compressor of the character described operable under variable intake and discharge pressures, a pair of members responsive respectively to intake and discharge pressures and including rotatable disks, one having a contact plate adjacent its periphery, an electric circuit for controlling the compressor and means movable by the first named member into and out of contact with said contact plate for controlling the circuit.

2. In a control device of the character described for limiting the loading of a compressor to a predetermined ratio between the intake and the discharge pressures, a plurality of members responsive respectively to the intake and the discharge pressures, one member including a rotatable disk having a cam on its face having a maximum point, the other member including a rotatable disk having a contact plate adjacent its periphery, an electric circuit, and a contact movable by the cam into circuit closing engagement with the disk-supported contact plate when the two members are moved under the influences of the intake and discharge pressures into positions indicating the predetermined ratio of the pressures.

3. In apparatus of the character described including a plurality of lines for conducting gas under variable pressures, means for compressing the gas having a normal power capacity, and compressor control elements including an electric circuit and members responsive to fluctuations of pressures in the lines, means operable by said members and effective when the ratio between the pressures is at approximately the normal power capacity of the compressor for controlling the circuit.

4. In apparatus of the character described including a flow line for fluid delivered to the line under pressure for flow therethrough, and a pump dividing the line into intake and discharge portions, said portions being respectively subject to variable pressures of the fluid therein, the pump operating at a predetermined value of the ratio between the pressures for passing fluid from the intake portion to the discharge portion, and means for controlling operation of the pump, a plurality of means responsive respectively to said pressures including means effective when the ratio of the pressures varies from said predetermined value controlling said pump control means.

5. In apparatus of the character described including a flow line for fluid delivered to the line under pressure, a pump in the line dividing the same into intake and discharge portions and operating when the pressure in the intake portion has a predetermined ratio to the pressure in the discharge portion, and means responsive respectively to said pressures including means effective when the pressure in the intake portion falls to a value below said predetermined ratio for suspending operation of the pump.

6. In apparatus of the character described including a pump, intake and discharge lines, and pump-operating means including an electric circuit, means including a second electric circuit and a member responsive to pressure in one of the lines controlling said operating means, and means responsive to pressure in the other line controlling said second circuit.

7. In a control device of the character described for limiting the loading of a compressor operable under variable intake and discharge pressures, a pair of members responsive respectively to intake and discharge pressures, an electric circuit for controlling the compressor, a contact plate on one of said members, and means movable by the other member into and out of contact with said plate for controlling the circuit.

8. In a control device of the character described for limiting the loading of a compressor operable under variable intake and discharge pressures, an electric circuit for controlling the compressor, a pair of members responsive respectively to the intake and discharge pressures, one of said members being rotative and provided with a contact plate, and means movable by the other member into and out of contact with said plate for controlling the circuit.

9. In a control device of the character described including members responsive to variable pressures, and an electric circuit, a contact plate movable by one of the members, and a contact movable by the other member for controlling the circuit.

10. In apparatus of the character described including a gas compressor, a motor for actuating the compressor, intake and discharge lines subject to variable pressures of fluid therein, and members responsive respectively to pressures in the intake and discharge lines, a plurality of cooperating means each independently controlled by one of said members and effective when the ratio of the pressures reaches a predetermined value for controlling the motor.

11. In apparatus of the character described including a flow line, a compressor interposed in the line, members responsive respectively to pressures in the line on opposite sides of the compressor, and means for controlling the compressor, means effective when the pressure effects on said members are in predetermined relation for rendering said control means effective.

In testimony whereof I affix my signature.

ALFRED J. DIESCHER.